United States Patent
Kim et al.

(10) Patent No.: US 6,760,738 B2
(45) Date of Patent: Jul. 6, 2004

(54) EXPONENT UNIT OF DATA PROCESSING SYSTEM

(75) Inventors: Yang-Ho Kim, Kyunggi-do (KR); Hong-Kyu Kim, Sungnam-shi (KR)

(73) Assignee: Samsung Electronics Co., Ltd., Suwon-si (KR)

(*) Notice: Subject to any disclaimer, the term of this patent is extended or adjusted under 35 U.S.C. 154(b) by 598 days.

(21) Appl. No.: 09/777,093

(22) Filed: Feb. 5, 2001

(65) Prior Publication Data

US 2001/0023424 A1 Sep. 20, 2001

(30) Foreign Application Priority Data

Mar. 14, 2000 (KR) .......................................... 2000-12770

(51) Int. Cl.⁷ .............................................. G06F 5/01
(52) U.S. Cl. ...................................... 708/211; 708/205
(58) Field of Search ................................... 708/211, 205

(56) References Cited

U.S. PATENT DOCUMENTS

| | | | | |
|---|---|---|---|---|
| 5,699,285 A | * | 12/1997 | Miyanishi et al. | 708/205 |
| 6,154,760 A | * | 11/2000 | Sharangpani | 708/205 |
| 6,301,594 B1 | * | 10/2001 | Ahmed | 708/205 |

* cited by examiner

*Primary Examiner*—David H. Malzahn
(74) *Attorney, Agent, or Firm*—F. Chau & Associates, LLC

(57) ABSTRACT

An exponent unit receives an operand and outputs an exponent of the operand that is equal to the number of consecutive bits of the operand that have the same value as the most significant bit (MSB) of the operand. The exponent unit can obtain an exponent value of an operand having a bit width that is greater than a processing bit width of a leading one detector (or a leading zero detector).

20 Claims, 4 Drawing Sheets

EXPONENT UNIT OF DATA PROCESSING SYSTEM

BACKGROUND

1. Technical Field

The present invention relates generally to a data processing system and, in particular, to a data processing unit including an exponent unit for outputting the number of consecutive bits having the same value as a most significant bit of an operand.

2. Background Description

An exponent unit used in a data processing system, such as a digital signal processor (DSP), outputs the number of consecutive bits having the same value as a most significant bit (MSB) of an operand. An exponent value, which is output from such an exponent unit, is used as shift information for performing a fixed point arithmetic operation or a multiplication/division arithmetic operation, enhancing the operation speed of the data processing system.

For example, if a binary "0.0000011" is expressed with the fixed-point number, left shifting is performed five times. An exponent thereof is a decimal "5". Using an exponent unit for a fixed point change, an exponent can easily be obtained. That is, an exponent having the same value as a most significant bit is a decimal "6". And, subtracting "1" from the "6" makes the "5".

It is understood that as the number of bits of data used in a data processing system for accurate data expression rises, a processing bit width of circuits formed therein must increase. Therefore, if the processing bit width of the data processing system increases, then that of the exponent unit must also increase. This causes increases in hardware area and manufacturing costs.

Therefore, it is an object of the present invention to provide an exponent unit of a data processing system which can process at least double data bits with a minimal addition of hardware.

SUMMARY OF THE INVENTION

To achieve the above and other objects of the present invention, there is provided an exponent unit adapted to receive an operand and to output an exponent of the operand, and a data processing system including the exponent unit. The exponent of the operand output from the exponent unit is equal to the number of consecutive bits of the operand that have the same value as the most significant bit (MSB) of the operand.

According to a first aspect of the invention, there is provided an exponent unit adapted to receive an operand and to output an exponent of the operand The exponent unit includes a detection device adapted to detect a number of consecutive bits of the operand having a same value as a most significant bit (MSB) of the operand, and to output a detection value corresponding thereto. A mantissa and carry control device is adapted to output the detection value as a mantissa signal in at least one of a single precision mode and, when a previous first status bit is set and the MSB is identical to a previous second status bit, in a double precision mode. The mantissa and carry control device is also adapted to generate a carry signal in the double precision mode, when the previous first status bit is set and the MSB is identical to the previous second status bit. An augend control device is adapted to output an exponent of a previous operand as an augend signal. A logic circuit is adapted to set a first status bit and to set a second status bit to a lowest bit of the operand, when all bits of the operand have an identical value. An adder is adapted to add the mantissa signal, the augend signal, and the carry signal to obtain a sum thereof, and to output the sum as the exponent of the operand. The single precision mode and the double precision mode are sequentially generated, and the exponent of the operand is equal to the number of consecutive bits of the operand having the same value as the MSB of the operand.

According to a second aspect of the invention, there is provided a data processing system. The data processing system includes an exponent unit adapted to output an exponent of an operand that is equal to a number of consecutive bits of the operand having a same value as a most significant bit (MSB) of the operand. A status register is adapted to store previous first and second status bits. A decoder is adapted to decode an instruction including the operand, to supply the operand and the previous first and second status bits stored in the status register to the exponent unit when the decoded instruction is an exponent instruction, and to output a mode signal having a first level or a second level depending upon whether the decoded instruction is a single precision exponent instruction or a double precision exponent instruction, respectively. The exponent unit includes first and second latches, a mantissa and carry control device, an augend control device, a logic circuit, and an adder. The first and second latches are adapted to latch the previous first and second status bits supplied from the status register, respectively. The detection device is adapted to detect the number of consecutive bits of the operand having the same value as the MSB, and to output a detection value corresponding thereto. The mantissa and carry control device is adapted to output the detection value as a mantissa signal when the mode signal is at the first level or when the mode signal is at the second level, the previous first status bit is set, and the previous second status bit is identical to the MSB, and to output a carry signal when the mode signal is at the second level, the previous first status bit is set, and the previous second status bit is identical to the MSB. The augend control device is adapted to output an exponent of a previous operand as an augend signal when the mode signal is at the second level. The logic circuit is adapted to set a first status bit and to set a second status bit to a lowest bit of the operand, when all bits of the operand have an identical value. The adder is adapted to add the mantissa signal, the augend signal, and the carry signal to obtain a sum thereof, and to output the sum as the exponent of the operand. The first and second latches are further adapted to retain a latched value for a predetermined time, and the single precision exponent instruction and the double precision exponent instruction are sequentially generated.

These and other aspects, features and advantages of he present invention will become apparent from the following detailed description of preferred embodiments, which is to be read in connection with the accompanying drawings.

DETAILED DESCRIPTION OF PREFERRED EMBODIMENTS

Figure 1:
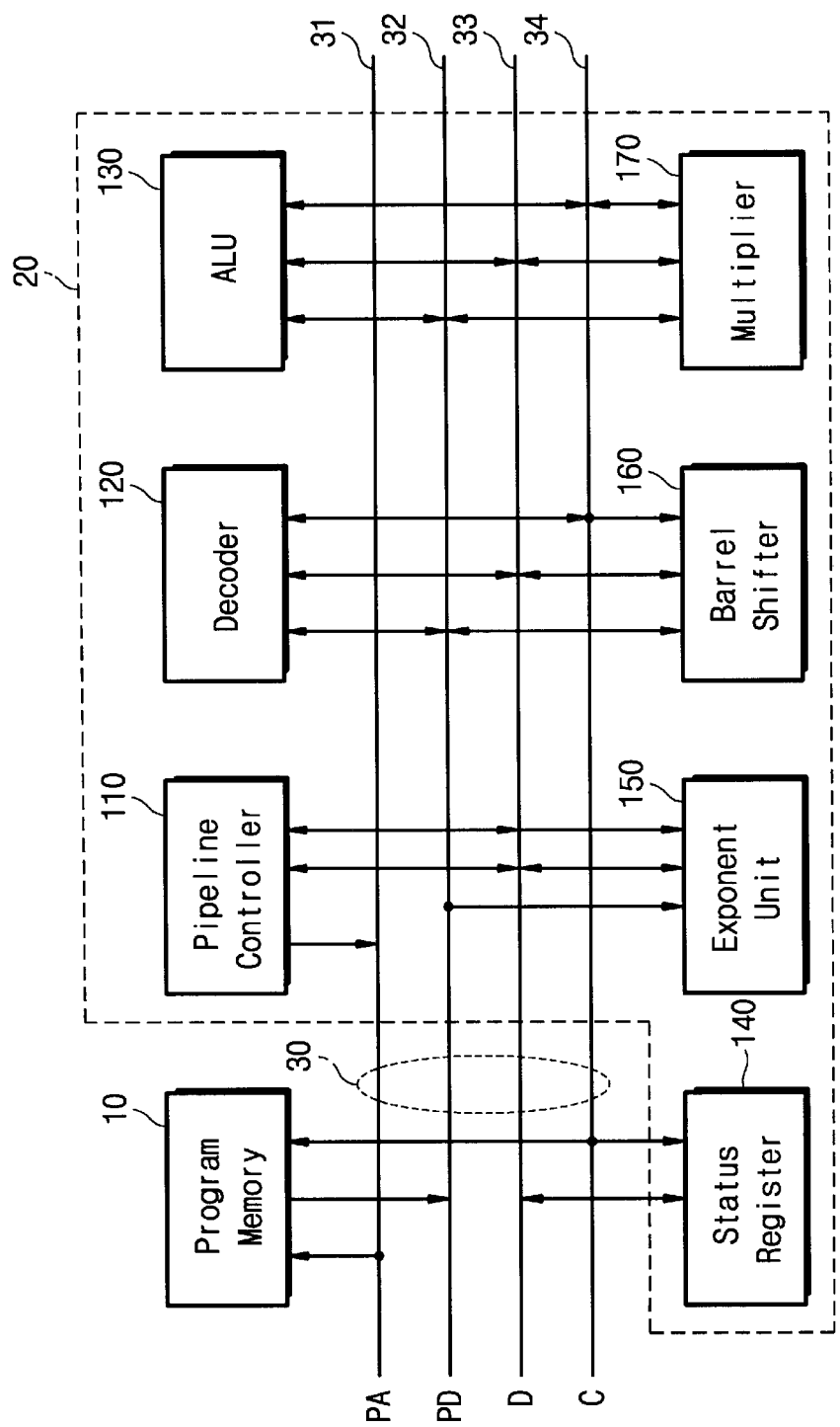
FIG. 1 is a block diagram illustrating a structure of a digital signal processor (DSP), in accordance with a preferred embodiment of the invention.

FIG. 1 is a block diagram illustrating a structure of a digital signal processor (DSP), in accordance with a preferred embodiment of the invention. A processor bus 30 interconnects an external program memory 10 to a digital signal processor 20. The processor bus 30 includes a program address bus 31, a program data bus 32, a data bus 33, and a control bus 34. The digital signal processor 20 includes a pipeline controller 110 coupled to the processor bus 30, a decoder 120, an arithmetic logic unit (ALU) 130, a status register 140, an exponent unit 150, a barrel shifter 160, and a multiplier 170.

In the preferred embodiment, the digital signal processor 20 performs pipeline processing. A pipeline includes, for example, fetch, decode, and execute steps, which are controlled by the pipeline controller 110. The pipeline controller 110 generates an address of an instruction that will be fetched from the program memory 10. The decoder 120 decodes a fetched instruction from the program memory 10. If the decoded instruction is an exponent instruction, then the decoder 120 supplies an operand included in the fetched instruction to the exponent unit 150. Then, the decoder 120 controls status bits (an overflow bit and a carry bit) stored in the status register 140 to be supplied to the exponent unit 150.

The exponent instruction is classified into a single precision (or standard) exponent instruction and a double precision exponent instruction.

EXP A

The above instruction is a single precision exponent instruction for evaluating an exponent of an operand A, which is composed of, for example, 24 bits (single precision). An exponent value of a 48-bit (double precision) operand can be obtained during two cycles, using the following instructions.

//Double precision exponent evaluation about {A, B}

EXP A

EXPC B

That is, using the single precision exponent instruction "EXP A", an exponent value of the upper 24 bits (A) of the 48-bit operand is obtained. Then, using the double precision exponent instruction "EXPC B", an exponent value of the lower 24 bits (B) is obtained. In this case, generation of the double precision exponent instruction must be sequential to that of the single precision exponent instruction. The total exponent value of the 48-bit operand is equal to the value of adding the exponent value of the upper 24 bits (A) to that of the lower 24 bits (B).

Figure 2:
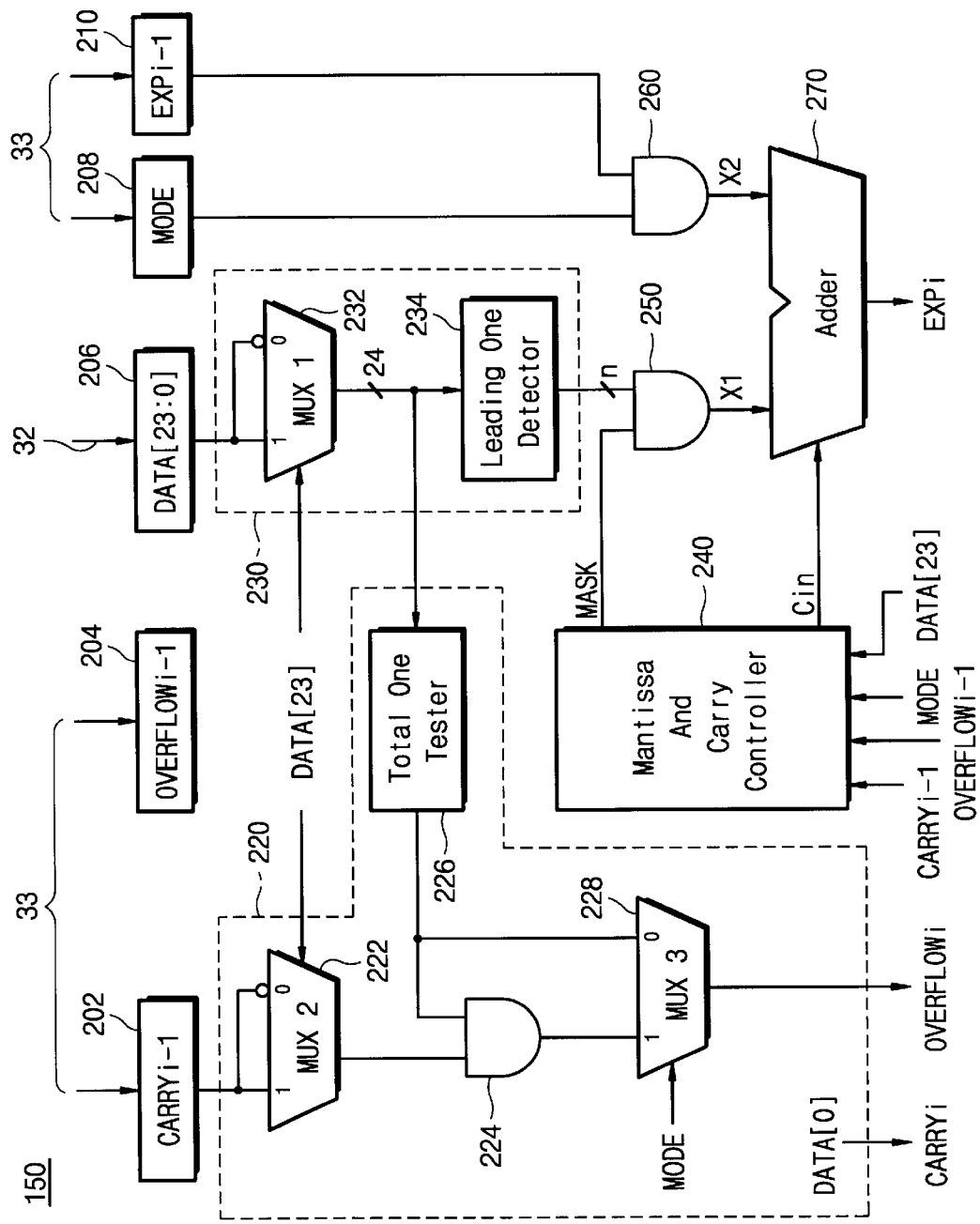
FIG. 2 is a block diagram illustrating an exponent unit, which can obtain an exponent value of a 48-bit operand using a 24-bit leading one detector, in accordance with a preferred embodiment of the invention.

FIG. 2 is a block diagram illustrating an exponent unit 150, in accordance with a preferred embodiment of the invention. In the embodiment of FIG. 2, an exponent value of a 48-bit operand can be obtained using a 24-bit reading one detector 234.

The exponent unit 150 includes latches 202, 204, 206, 208, and 210, a logic circuit 220, an exponent detector 230, a mantissa and carry controller 240, AND gates 250 and 260, and an adder 270. The latches 202 and 204 receive and latch a carry bit $CARRY_{i-1}$ and an overflow bit $OVERFLOW_{i-1}$, respectively. The carry bit $CARRY_{i-1}$ and the overflow bit $OVERFLOW_{i-1}$, are stored in the status register 140. The latch 206 latches an operand DATA[23:0] that is input through a program data bus 32. The latch 208 latches a mode signal MODE that indicates whether an instruction decoded in the decoder 120 is a single precision exponent instruction or a double precision exponent instruction. If the decoded instruction is the single precision exponent instruction, then the mode signal MODE has a high level (logic "1").

However, if the decoded instruction is the double precision exponent instruction, then the mode signal MODE has a low level (logic "0"). The latch 210 latches an exponent $EXP_{i-1}$ of a previous operand. The latches 202, 204, 206, 208, and 210 hold a latched value during one cycle.

The exponent detector 230 is composed of a multiplexer 232 and a 24-bit leading one detector 234, and detects an exponent value of an operand DATA[23:0]. If a latched most significant bit DATA[23] of an operand to the latch 206 is "0", then the multiplexer 232 inverts and outputs an operand latched to the latch 206. If a latched most significant bit DATA[23] of an operand to the latch 206 is "1", then the multiplexer 232 outputs the latched operand thereto as it is (i.e., unaltered). Accordingly, the most significant bit (MSB) of the operand output from the multiplexer 232 is always "1". The leading one detector 234 receives the operand output from the multiplexer 232, and detects the number of "1s" that are consecutive from a (MSB-1)th bit. Since the most significant bit is always "1", the leading one detector 234 can detect the number (i.e., exponent values) of consecutive bits having the same value as the most significant bit ("1").

It is to be appreciated that the exponent detector 230 may also be implemented using a leading zero detector instead of the leading one detector 234. In such a case, if the most significant bit is "0", then the multiplexer 232 outputs the latched operand to the latch 206 as it is. However, if the most significant bit is "1", then the multiplexer 232 inverts and outputs the latched operand thereto. Given the teachings of the present invention provided herein, one of ordinary skill in the related art will contemplate these and various other variations of the elements of the present invention, while maintaining the spirit and scope thereof.

If the decoded instruction is a single precision exponent instruction, then the value detected in the exponent detector 230 is the true exponent value of an operand A. If the decoded instruction is a double precision exponent instruction, then the detected value is an exponent value of an operand B. Accordingly, adding the detected value to an exponent value of a previous operand results in the true exponent value of a double precision operand. A value detected in the exponent detector 230 is output as it is, or is added to an exponent value of a previous operand, depending upon whether the decoded instruction is a single precision exponent instruction or a double precision exponent instruction. Such operations are performed by the mantissa and carry controller 240, the AND gates 250 and 260, and the adder 270.

The logic circuit 220 includes multiplexers 222 and 228, an AND gate 224, and a total one tester 226. The total one tester 226 tests whether all bits of an operand output from a multiplexer 232 of the exponent detector 230 have the same value. In the preferred embodiment, the multiplexer 232 inverts/non-inverts and outputs an operand DATA[23:0] such that a most significant bit is "1". Accordingly, by testing whether all of the bits of an operand are "1", it can be determined whether the bits have an identical value. The total one tester 226 is composed of, for example, an AND gate, and outputs a high-level signal if all the bits have the identical value ("1").

If a decoded instruction is a single precision exponent instruction (i.e., a mode signal MODE is low level), then a signal output from the total one tester 226 is output to an overflow bit $OVERFLOW_i$. That is, if all of the bits of an operand DATA[23:0] are "1", then a value of the overflow bit $OVERFLOW_i$ is set to "1". A carry bit $CARRY_i$ is set to a lowest bit DATA[0] of an operand that is latched to the latch 206.

If the decoded instruction is a double precision exponent instruction (i.e., the mode signal MODE is a high level), then the value of the overflow bit $OVERFLOW_i$ is set using another manner. Specifically, if a most significant bit DATA [23] of a current operand is "0", then the multiplexer 222 inverts and outputs a previous carry bit $CARRY_{i-1}$. However, if a most significant bit DATA[23] of a current operand is "1", then the multiplexer 222 outputs the previous carry bit $CARRY_{i-1}$ as it is. The AND gate 224 performs an AND operation with respect to an output signal of the total one tester 226. The output signal of the AND gate 224 is set to the overflow bit $OVERFLOW_i$. If the decoded instruction is a double precision exponent instruction, then the output signal of the tester 226 is set to $OVERFLOW_i$ when $CARRY_{i-1}$ has the same value as DATA[23] of the current operand.

In other words, if the overflow bit $OVERFLOW_i$ is set to "1" after performing a single precision exponent instruction, then all of the bits of a 24-bit operand have an identical value. If the overflow bit $OVERFLOW_i$ is set to "1" after performing a double precision exponent instruction, then all of the bits of a 48-bit operand have an identical value. It is to be appreciated that in case of a double precision exponent instruction, although the upper 24 bits have an identical value and the lower 24 bits have an identical value, the value of the upper 24 bits may be different from that of the lower 24 bits. If the overflow bit $OVERFLOW_i$ is not set to "1", then the carry bit $CARRY_i$, the multiplexer 222, and the AND gate 224 are used to check whether a lowest bit of the previous operand A is equal to a most significant bit of the current operand B.

The carry bit $CARRY_i$ and the overflow $OVERFLOW_i$, which are output from the logic circuit 220, are stored in the status register 140. However, the previous carry bit $CARRY_{i-1}$, and the previous overflow bit $OVERFLOW_{i-1}$, which are latched to the latches 202 and 204, are retained during one cycle when an instruction is performed.

Figure 3:
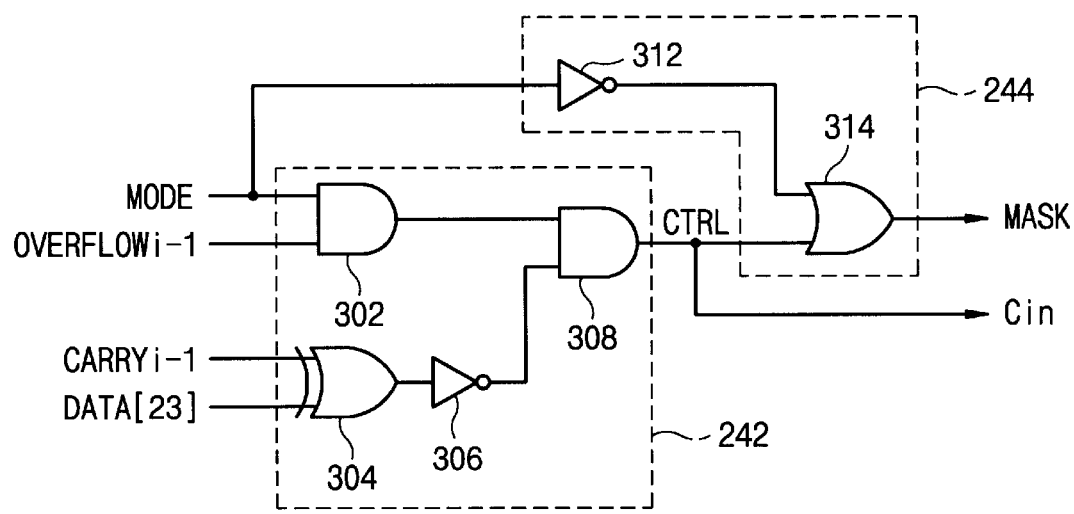
FIG. 3 is a schematic diagram further illustrating a mantissa and carry controller of FIG. 2, in accordance with an illustrative embodiment of the invention.

The mantissa and carry controller 240 receives the latched values $CARRY_{i-1}$, $OVERFLOW_{i-1}$, MODE, and DATA[23] from the latches 202, 204, 206, and 208, and combines these values to generate a mask signal MASK and a carry signal Cin. FIG. 3 is a schematic diagram further illustrating the mantissa and carry controller 240 of FIG. 2, in accordance with an illustrative embodiment of the invention. The mantissa and carry controller 240 includes a first logic circuit 242 and a second logic circuit 244. The first logic circuit 242 is composed of AND gates 302 and 308, an exclusive-OR gate 304, and an inverter 306. The second logic circuit 244 is composed of an inverter 312 and an OR gate 314. If $OVERFLOW_{i-1}$ (latched by the latch 204) is "1", $CARRY_{i-1}$ (latched by the latch 202) and DATA[23] are identical to each other, and MODE is at the high level (i.e., a decoded instruction is a single precision exponent instruction), then the first logic circuit 242 outputs a high-level control signal CTRL. If MODE is at the low level (i.e., a decoded instruction is a single precision exponent instruction) or CTRL is at the high level, then the second logic circuit 244 outputs a mask signal MASK and the control signal CTRL is output as a carry signal Cin.

Returning to FIG. 2, the AND gate 250 selectively supplies an exponent value that is output from the exponent detector 230 to a mantissa X1 of the adder 270 in response to a mask signal MASK that is output from the mantissa and carry controller 240. That is, if a decoded instruction is a single precision exponent instruction, then an exponent value that is output from the exponent detector 230 is directly supplied to the mantissa X1 of the adder 270. Moreover, if a decoded instruction is a double precision exponent instruction, then the exponent value from the exponent detector 230 is also directly supplied to the mantissa X1 of the adder 270, under the following conditions: all of the bits of a previous operand have an identical value; and a lowest bit of the previous operand and a most significant bit of a current operand have an identical value.

The AND gate 260 performs an AND operation with respect to the mode signal MODE and an exponent value $EXP_{i-1}$ of the previous operand. Then, the AND gate 260 supplies a result of the AND operation to an augend X2 of the adder 270. The adder 270 adds the exponent values X1 and X2 and the carry signal Cin. An exponent value $EXP_i$, which outputs from the adder 270, is a true exponent value of a currently decoded exponent instruction.

Figure 4:
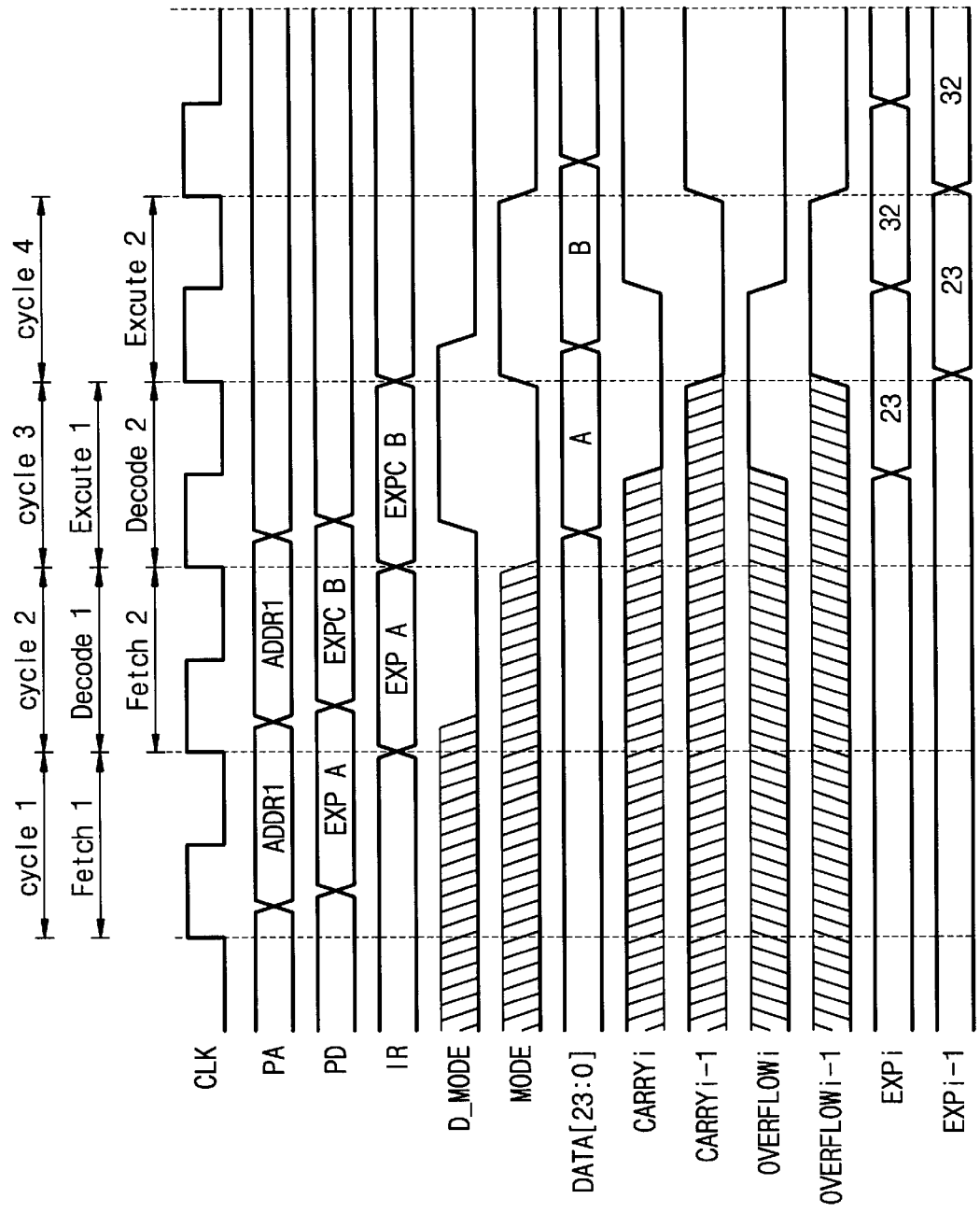
FIG. 4 is a timing diagram illustrating an operation of an exponent unit, in accordance with a preferred embodiment of the invention.

FIG. 4 is a timing diagram illustrating an exponent operation of an exponent unit, in accordance with a preferred embodiment of the invention. To obtain an exponent value of a double precision number "0.000 0000 0000 0000 0000 0000 0000 0000 0100 1100 1010 1110", the following steps are performed:

EXP A

EXPC B here, A=0.000 0000 0000 0000 0000 0000
   B=0000 0000 0100 1100 1010 1110

During a first clock cycle (Cycle 1), the pipeline controller 110 generates an address that will be fetched from the program memory 10. An instruction EXP A, which is fetched in the program memory 10, is loaded on the program data bus 32.

During a second clock cycle (Cycle 2), the instruction EXP A that is fetched to the program memory 10 is supplied to an instruction register IR of the decoder 120 through the program data bus 32. The decoder 120 decodes an instruction that is stored in the instruction register IR. If the decoded instruction is an exponent instruction, the decoder 120 supplies an operand A to the exponent unit 150. The decoder 120 controls a carry bit $CARRY_{i-1}$ and an overflow bit $OVERFLOW_{i-1}$, which is stored in the status register 140, and is to be supplied to the exponent unit 150. The operand A is latched to the latch 206 of the exponent unit 150 through the program data bus 32. The bits $CARRY_{i-1}$ and $OVERFLOW_{i-1}$ are latched to the latches 202 and 204 of the exponent unit 150 through the data bus 34, respectively. The decoder 120 generates a mode signal D_MODE of low level (logic "0") because the decoded instruction is a single precision exponent instruction. The mode signal D_MODE is latched to the latch 208. The pipeline controller 110 generates the next fetch address ADDR2 during the second clock cycle (Cycle 2). The fetched instruction EXP A in the program memory 10 is loaded on the program data bus 32.

During a third clock cycle, the exponent unit 150 obtains an exponent value of an operand A. Since a most significant bit (MSB) of an operand DATA[23:0] latched to the latch 206 is "0", the multiplexer 232 selects and outputs an inverted operand. Therefore, an operand that outputs through the multiplexer 232 is "1111 1111 1111 1111 1111 1111". The leading one detector 234 detects the number of "1s" that are consecutive from a (MSB-1)th bit of the operand. In this example, a value that outputs from the leading one detector 234 is decimal "23".

Since the mode signal MODE is low level, a mask signal MASK that outputs from the mantissa and carry controller 240 goes to high level. Thus, a signal that outputs from the leading one detector 234 is supplied to the mantissa X1 of the adder 270 through the AND gate 250. However, the augend X2 and the carry signal Cin become "0". Thus, the adder 270 outputs decimal "23", which is an exponent value of the operand A.

Since all bits of an operand, which output from the multiplexer 232, are "1", the overflow bit OVERFLOW$_i$ is set to "1". Further, since a lowest bit DATA[0] of an operand latched to the latch 206 is "0", the carry bit CARRY$_i$ is set to "0". These status bits OVERFLOW$_i$ and CARRY$_i$ are stored in the status register 140.

During the third clock cycle, the fetched instruction EXPC B in the program memory 10 is supplied to the instruction register IR of the decoder 120 through the program data bus. The decoder 120 decodes an instruction stored in the instruction register IR. If the decoded instruction is an exponent instruction, the decoder 120 supplies an operand B to the exponent unit 150. The decoder 120 controls the carry bit CARRY$_{i-1}$ and the overflow bit OVERFLOW$_{i-1}$, which are stored in the status register 140, and are to be supplied to the exponent unit 150. After performing the previous exponent instruction EXP A, the bits CARRY$_{i-1}$, and OVERFLOW$_{i-1}$ have set values. The supplied operand B from the decoder 120 is latched to the latch 206 of the exponent unit 150 through the program data bus 32. The supplied bits CARRY$_{i-1}$, and OVERFLOW$_{i-1}$ from the status register 140 are latched to the latches 202 and 204 of the exponent unit 150, respectively. The decoder 120 generates a mode signal D_MODE of high level (logic "1") because the decoded instruction is a double precision exponent instruction.

During a fourth clock cycle, the exponent unit 150 obtains an exponent value of an operand B (=0000 0000 0100 1100 1010 1110). The multiplexer 232 selects and outputs an inverted operand because a most significant bit (MSB) of an operand DATA[23:0] latched to the latch 206 is "0". Thus, an operand that outputs through the multiplexer 232 is "1111 1111 1011 0011 0101 0001". The leading one detector 234 detects the number of "1s" that are consecutive from an (MSB-1)th bit of the operand. In this example, a value that outputs from the leading one detector 234 is decimal "8".

Since the mode signal MODE is high level, the previous overflow bit OVERFLOW$_{i-1}$ is "1", the previous carry bit CARRY$_{i-1}$ is "0", and the most significant bit DATA[23] of the operand B is "0", a mask signal MASK that outputs from the mantissa and carry controller 240 goes to high level. Therefore, a signal that outputs from the mantissa and carry controller 240 is supplied to the adder 270 through the AND gate 250. Since the mode signal MODE is high level, the exponent value EXP$_{i-1}$ of the Previous operand A is supplied to the mantissa X1 of the adder 270 through the AND gate 250. Further, since the mode signal MODE is high level, the exponent value EXP$_{i-1}$ of the previous operand A is supplied to the augend X2 of the adder 270 through the AND-type gate 260. The carry signal Cin that is supplied from the mantissa and carry controller 240 becomes "1". Therefore, the adder 270 outputs decimal "32", which is the sum of X1, X2, and Cin, as an exponent value of the operand B.

The leading one detector 234 outputs decimal "23" as an exponent value of the operand A during the third cycle, and outputs decimal "8" as an exponent value of the operand B during the fourth cycle. Therefore, a sum of the exponent values of the operands A and B is "31". However, a practical value of a double precision number "0.000 0000 0000 0000 0000 0000 0000 0000 0100 1100 1010 1110" must be "32". If all the bits of the previous operand A have an identical value, and a lowest bit of the previous operand A and a most significant value of the current operand B have an identical value, then the carry signal Cin becomes "1" and is supplied to the adder 270.

Since all bits of an operand output from the multiplexer 232 are not "1", the overflow bit OVERFLOWi is set to "0". Further, since a lowest bit DATA[0] of an operand latched to the latch 206 is "0", the carry bit CARRY$_i$ is set to "0". The status bits OVERFLOW$_i$ and CARRY$_i$ are stored in the status register 140 through the data bus 33.

As mentioned above, using a 24-bit leading one detector, an exponent value of a 48-bit operand can be obtained during a second clock cycle. Therefore, it is possible to obtain an exponent value of an operand having a bit width greater than a processing bit width of a leading one detector, with minimal addition of hardware. Since an exponent unit with such a circuit structure may have a leading one detector that processes half of the data bit width to be processed, hardware area and manufacturing cost can be reduced.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. An exponent unit adapted to receive an operand and to output an exponent of the operand, comprising:

a detection device adapted to detect a number of consecutive bits of the operand having a same value as a most significant bit (MSB) of the operand, and to output a detection value corresponding thereto;

a mantissa and carry control device adapted to output the detection value as a mantissa signal in at least one of a single precision mode and, when a previous first status bit is set and the MSB is identical to a previous second status bit, in a double precision mode, and to generate a carry signal in the double precision mode, when the previous first status bit is set and the MSB is identical to the previous second status bit;

an augend control device adapted to output an exponent of a previous operand as an augend signal;

a logic circuit adapted to set a first status bit and to set a second status bit to a lowest bit of the operand, when all bits of the operand have an identical value; and an adder adapted to add the mantissa signal, the augend signal, and the carry signal to obtain a sum thereof, and to output the sum as the exponent of the operand, wherein the single precision mode and the double precision mode are sequentially generated, and the exponent of the operand is equal to the number of consecutive bits of the operand having the same value as the MSB of the operand.

2. The exponent unit of claim 1, wherein said logic circuit is further adapted to test whether all of the bits of the operand have the identical value.

3. The exponent unit of claim 1, further comprising a mode signal having a first level in the single precision mode and a second level in the double precision mode.

4. The exponent unit of claim 3, wherein said mantissa and carry control device comprises:

a first logic circuit adapted to output a control signal in the double precision mode, when the previous first status bit is set and the MSB is identical to the previous second status bit;

a second logic circuit adapted to perform an OR operation with respect to an inverted version of the mode signal and the control signal to output a mask signal; and a third logic circuit adapted to select and output the detection value of said detection device in response to the mask signal, wherein the control signal is provided as the carry signal.

5. The exponent unit of claim 3, further comprising:

a first latch adapted to store the previous first status bit;

a second latch adapted to store the previous second status bit;

a third latch adapted to store the mode signal;

a fourth latch adapted to store the operand;

a fifth latch adapted to store the exponent of the previous operand, wherein the first to fifth latches are further adapted to retain a latched value for a predetermined time.

6. The exponent unit of claim 3, wherein said augend control device comprises a fourth logic circuit adapted to perform an AND operation with respect to the mode signal and the exponent of the previous operand to output the augend signal.

7. The exponent unit of claim 1, wherein said detection device comprises:

a first multiplexer adapted to select and output an inverted version of the operand when the MSB is logic "0", and to select and output the operand when the MSB is logic "1"; and a leading one detector adapted to detect a number of logic "1s" from an (MSB-1)th bit of the operand.

8. The exponent unit of claim 7, wherein the operand has a bit width greater than a processing bit width of said leading one detector.

9. The exponent unit of claim 7, wherein said logic circuit comprises a tester adapted to test whether all bits of an output from said first multiplexer are logic "1", and to output a test signal corresponding thereto.

10. The exponent unit of claim 9, wherein said logic circuit comprises:

a second multiplexer adapted to select and output the previous second status bit when the MSB is logic "1", and to select and output an inverted version of the previous second status bit when the MSB is logic "0";

an AND gate adapted to perform an AND operation with respect to an output signal from said second multiplexer and the test signal from said tester; and a third multiplexer adapted to select and output one of the test signal from said tester and an output signal from said AND gate as the first status bit, in response to the mode signal.

11. A data processing system comprising:

an exponent unit adapted to output an exponent of an operand that is equal to a number of consecutive bits of the operand having a same value as a most significant bit (MSB) of the operand;

a status register adapted to store previous first and second status bits; and a decoder adapted to decode an instruction comprising the operand, to supply the operand and the previous first and second status bits stored in said status register to said exponent unit when the decoded instruction is an exponent instruction, and to output a mode signal having a first level or a second level depending upon whether the decoded instruction is a single precision exponent instruction or a double precision exponent instruction, respectively, wherein the exponent unit comprises:

first and second latches adapted to latch the previous first and second status bits supplied from said status register, respectively;

a detection device adapted to detect the number of consecutive bits of the operand having the same value as the MSB, and to output a detection value corresponding thereto;

a mantissa and carry control device adapted to output the detection value as a mantissa signal when the mode signal is at the first level or when the mode signal is at the second level, the previous first status bit is set, and the previous second status bit is identical to the MSB, and to output a carry signal when the mode signal is at the second level, the previous first status bit is set, and the previous second status bit is identical to the MSB;

an augend control device adapted to output an exponent of a previous operand as an augend signal when the mode signal is at the second level;

a logic circuit adapted to set a first status bit and to set a second status bit to a lowest bit of the operand, when all bits of the operand have an identical value; and an adder adapted to add the mantissa signal, the augend signal, and the carry signal to obtain a sum thereof, and to output the sum as the exponent of the operand;

wherein said first and second latches are further adapted to retain a latched value for a predetermined time, and the single precision exponent instruction and the double precision exponent instruction are sequentially generated.

12. The exponent unit of claim 11, wherein said logic circuit is further adapted to test whether all of the bits of the operand have the identical value.

13. The data processing system of claim 11, wherein said mantissa and carry control device includes:

a first logic circuit adapted to output a control signal when the mode signal has the second level, the previous first status bit is set, and the previous second status bit is identical to the MSB;

a second logic circuit adapted to perform an OR operation with respect to an inverted version of the mode signal and the control signal to output a mask signal; and a third logic circuit adapted to select and output the detection value of the detection device as the mantissa signal in response to the mask signal, wherein the control signal is provided as the carry signal.

14. The data processing system of claim 11, wherein the augend control device includes a fourth logic circuit adapted to perform an AND operation with respect to the mode signal and the exponent of the previous operand to output the augend signal.

15. The data processing system of claim 11, wherein the detection device includes:

a first multiplexer adapted to select and output an inverted version of the operand when the MSB is logic "0", and to select and output the operand when the MSB is logic "1"; and a leading one detector adapted to detect a number of logic "1s" from an (MSB-1)th bit of the operand.

16. The exponent unit of claim 15, wherein the operand has a bit width greater than a processing bit width of said leading one detector.

17. The data processing unit of claim 15, wherein said logic circuit comprises a tester adapted to test whether all the bits of an output from said first multiplexer are logic "1", and to output a test signal corresponding thereto.

18. The data processing unit of claim 15, wherein said logic circuit comprises:
- a second multiplexer adapted to select and output the previous second status bit when the MSB is logic "1", and to select and output an inverted version of the previous second status bit when the MSB is logic "0";
- an AND gate adapted to perform an AND operation with respect to an output signal from said second multiplexer and the test signal from said tester; and
- a third multiplexer adapted to select and output one of the test signal from said tester and an output signal from said AND gate as the first status bit in response to the mode signal.

19. An exponent unit adapted to receive an operand and to output an exponent of the operand, comprising:
- a detection and control device adapted to detect a number of consecutive bits of the operand having a same value as a most significant bit (MSB) of the operand, to output a mantissa signal corresponding thereto in at least one of a single precision mode and, when a previous first status bit is set and the MSB is identical to a previous second status bit, in a double precision mode, and to generate a carry signal in the double precision mode, when the previous first status bit is set and the MSB is identical to the previous second status bit;
- an augend control device adapted to output an exponent of a previous operand as an augend signal; and
- an adder adapted to add the mantissa signal, the augend signal, and the carry signal to obtain a sum thereof, and to output the sum as the exponent of the operand, wherein the single precision mode and the double precision mode are sequentially generated, and the exponent of the operand is equal to the number of consecutive bits of the operand having the same value as the MSB of the operand.

20. The exponent unit of claim 19, wherein said detection and control device comprises:
- a first multiplexer adapted to select and output an inverted version of the operand when the MSB is logic "0", and to select and output the operand when the MSB is logic "1"; and
- a leading one detector adapted to detect a number of logic "1s" from an (MSB-1)th bit of the operand, wherein the operand has a bit width greater than a processing bit width of said leading one detector.

* * * * *